United States Patent
West et al.

(10) Patent No.: US 10,527,449 B2
(45) Date of Patent: Jan. 7, 2020

(54) USING MAJOR ROUTE DECISION POINTS TO SELECT TRAFFIC CAMERAS FOR DISPLAY

(71) Applicant: Microsoft Technology Licensing, LLC, Redmond, WA (US)

(72) Inventors: Jeff West, Sammamish, WA (US); David Grochocki, Jr., Seattle, WA (US); Geoffrey T. Ebersol, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 15/484,046

(22) Filed: Apr. 10, 2017

(65) Prior Publication Data

US 2018/0292225 A1    Oct. 11, 2018

(51) Int. Cl.
*G01C 21/36* (2006.01)
*G01C 21/34* (2006.01)
(Continued)

(52) U.S. Cl.
CPC ..... *G01C 21/3691* (2013.01); *G01C 21/3492* (2013.01); *G01C 21/3647* (2013.01);
(Continued)

(58) Field of Classification Search
CPC ............ G01C 21/3602; G01C 21/3641; G01C 21/3647; G01C 21/3676; G01C 21/3682; G01C 21/3691
See application file for complete search history.

(56) References Cited

U.S. PATENT DOCUMENTS 6,140,943 A * 10/2000 Levine ............... G01C 21/3647
340/905
6,199,014 B1 * 3/2001 Walker ............... G01C 21/3647
340/995.2
(Continued)

FOREIGN PATENT DOCUMENTS

WO    2015134386 A2    9/2015

OTHER PUBLICATIONS

LiTMas: Live road Traffic Maps for Smartphones; S.M. Iftekharul Alam, Sonia Fahmy, Yung-Hsiang Lu; Purdue University pp. 1-6, 2015 (Note that this NPL is not being provided because it is already in the case file as of Apr. 10, 2017) (Year: 2015).*

(Continued)

*Primary Examiner* — Thomas E Worden
(74) *Attorney, Agent, or Firm* — Newport IP, LLC; Mike R. Cicero

(57) ABSTRACT

Techniques enable selection of traffic cameras for display to a user, where the techniques involve determining a primary route and an alternate route, determining a first intersection between the primary route and the alternate route, and obtaining camera metadata identifying multiple cameras, where the camera metadata defines aspects such as positioning data, direction, status data, and image data for individual traffic cameras. The techniques also involve determining a priority score for individual cameras using the camera metadata, where the priority score is based, at least in part, on proximity to the first intersection between the primary route and the alternate route. The techniques then involve selecting at least one traffic camera based on the priority score of the camera and communicating image data of the camera for display on a display device.

20 Claims, 11 Drawing Sheets

(51) Int. Cl.
  *G08G 1/01* (2006.01)
  *G08G 1/02* (2006.01)
  *G08G 1/04* (2006.01)
  *G08G 1/0968* (2006.01)
(52) U.S. Cl.
  CPC ............ *G08G 1/0116* (2013.01); *G08G 1/02* (2013.01); *G08G 1/04* (2013.01); *G08G 1/096838* (2013.01); *G01C 21/3641* (2013.01); *G01C 21/3676* (2013.01); *G01C 21/3682* (2013.01)

(56) References Cited

U.S. PATENT DOCUMENTS

| | | | | |
|---|---|---|---|---|
| 6,351,710 | B1* | 2/2002 | Mays | G01C 21/3647 340/995.2 |
| 8,237,791 | B2* | 8/2012 | Chen | G06K 9/209 345/419 |
| 8,301,372 | B2* | 10/2012 | Herbst | G01C 21/3638 340/995.1 |
| 8,423,292 | B2 | 4/2013 | Geelen et al. | |
| 8,718,910 | B2 | 5/2014 | Gueziec | |
| 8,738,285 | B2 | 5/2014 | Scofield et al. | |
| 9,076,332 | B2 | 7/2015 | Myr | |
| 9,418,482 | B1* | 8/2016 | Yang | G06F 17/30265 |
| 9,466,212 | B1* | 10/2016 | Stumphauzer, II | G08G 1/137 |
| 9,719,794 | B2* | 8/2017 | Nakano | G06F 16/51 |
| 2003/0214582 | A1* | 11/2003 | Takahashi | G01C 21/3647 348/116 |
| 2006/0271286 | A1* | 11/2006 | Rosenberg | G01C 21/3647 701/431 |
| 2007/0055441 | A1 | 3/2007 | Retterath et al. | |
| 2007/0118281 | A1* | 5/2007 | Adam | G01C 21/3647 701/431 |
| 2008/0046175 | A1* | 2/2008 | Tengler | G01C 21/3647 701/414 |
| 2008/0051997 | A1* | 2/2008 | Rosenberg | G01C 21/3647 701/431 |
| 2008/0147253 | A1* | 6/2008 | Breed | B60W 30/16 701/3 |
| 2008/0208447 | A1* | 8/2008 | Geelen | G01C 21/34 701/533 |
| 2008/0266142 | A1* | 10/2008 | Sula | G01C 21/3647 340/995.17 |
| 2009/0105933 | A1* | 4/2009 | Wlotzka | B60R 1/00 701/117 |
| 2009/0187300 | A1* | 7/2009 | Everitt | G01C 21/3602 701/31.4 |
| 2009/0198442 | A1* | 8/2009 | Takagi | G01C 21/3647 701/533 |
| 2009/0256906 | A1* | 10/2009 | Ilsaka | G01C 21/3647 348/113 |
| 2009/0327508 | A1* | 12/2009 | McCarthy | G01C 21/3647 709/231 |
| 2010/0094542 | A1* | 4/2010 | Kang | G01C 21/3647 701/533 |
| 2010/0121566 | A1* | 5/2010 | Joshi | G01C 21/3461 701/533 |
| 2010/0169010 | A1* | 7/2010 | Jeong | G01C 21/3647 701/533 |
| 2010/0250116 | A1* | 9/2010 | Yamaguchi | G01C 21/3644 701/533 |
| 2010/0250126 | A1* | 9/2010 | Epshtein | G01C 21/3602 701/438 |
| 2011/0046878 | A1* | 2/2011 | Sung | G01C 21/28 701/467 |
| 2012/0133770 | A1* | 5/2012 | Joao | G01C 21/3691 348/149 |
| 2012/0226437 | A1* | 9/2012 | Li | G01C 21/3647 701/423 |
| 2014/0067265 | A1 | 3/2014 | Maston | |
| 2014/0136098 | A1* | 5/2014 | Stroila | G01C 11/04 701/408 |
| 2014/0195155 | A1* | 7/2014 | Aist | G01C 21/3484 701/533 |
| 2014/0343849 | A1* | 11/2014 | Ohzawa | G01C 21/3492 701/537 |
| 2014/0350854 | A1* | 11/2014 | Sugimoto | G01C 21/3602 701/537 |
| 2015/0221220 | A1* | 8/2015 | Arai | G09G 5/36 340/907 |
| 2015/0260540 | A1* | 9/2015 | Ishikawa | G01C 21/3632 701/436 |
| 2016/0003635 | A1* | 1/2016 | Jung | G01C 21/36 701/412 |
| 2016/0018238 | A1* | 1/2016 | Grabar | G06F 16/29 701/437 |
| 2016/0069703 | A1* | 3/2016 | Nakano | G06F 16/51 701/428 |
| 2017/0314954 | A1* | 11/2017 | Golding | G01C 21/3644 |
| 2018/0060986 | A1* | 3/2018 | Suzuki | G06Q 50/30 |
| 2018/0112996 | A1* | 4/2018 | Montell | G06N 7/005 |
| 2019/0033085 | A1* | 1/2019 | Ogale | G01C 21/3446 |

OTHER PUBLICATIONS

Alam, et al., "LiTMaS: Live Road Traffic Maps for Smartphones", In Proceedings of IEEE 16th International Symposium on a World of Wireless, Mobile and Multimedia Networks, Jun. 14, 2015, 6 pages.

* cited by examiner

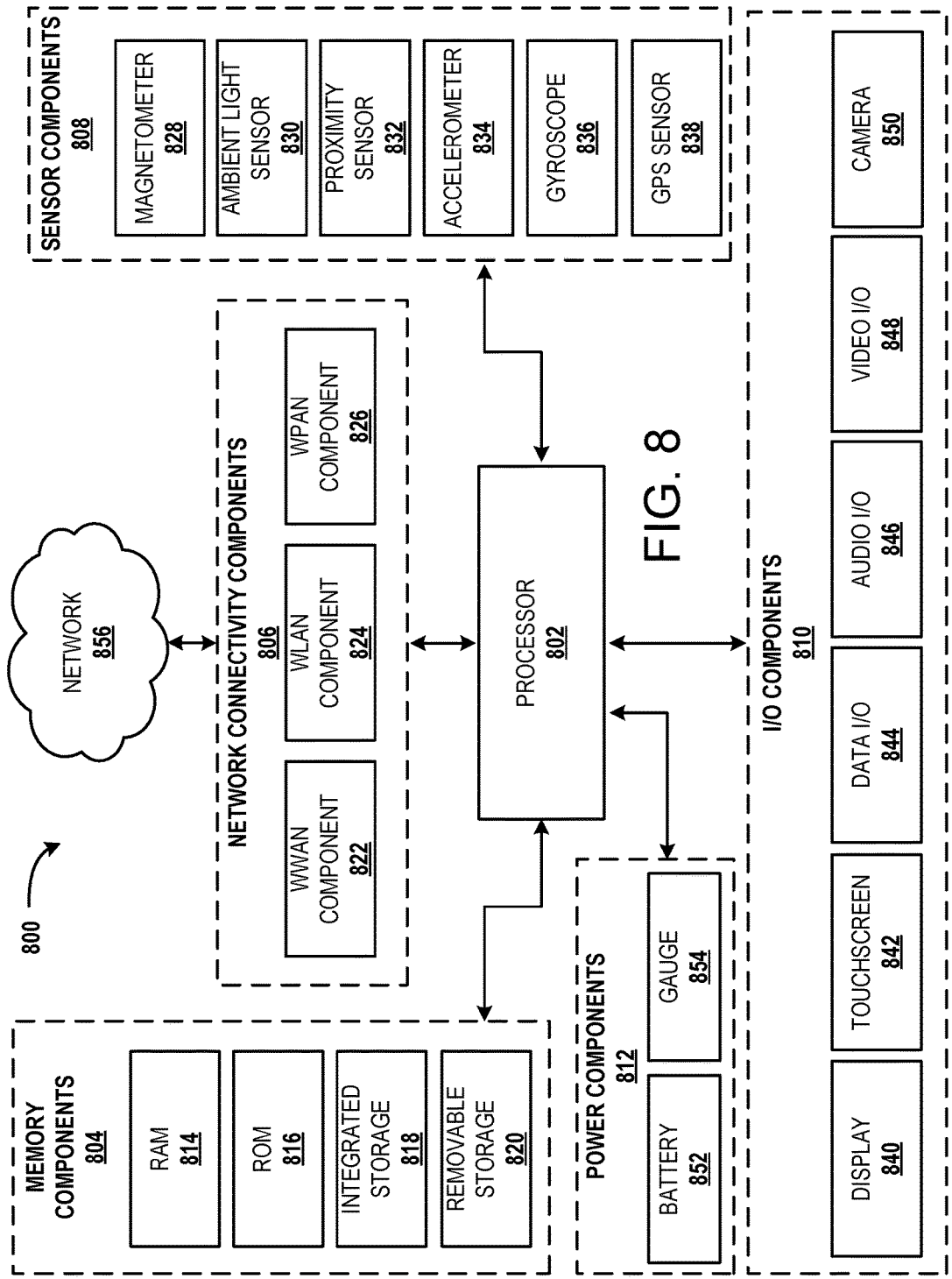

USING MAJOR ROUTE DECISION POINTS TO SELECT TRAFFIC CAMERAS FOR DISPLAY

BACKGROUND

Currently, many devices, such as mobile telephones or Global Positioning System (GPS) navigation devices, and systems, such as automobile on-board systems, include traffic applications that provide users with maps, driving directions, and traffic information. Many examples of these applications provide directions for a primary route from a current location to a destination location selected by a user. Some applications also provide one or more alternative routes that are displayed to a user along with the primary route.

Also, there are many traffic cameras now available, such as through state departments of transportation, that a user may view to evaluate traffic conditions as observable from the traffic cameras. Generally, a user accesses the traffic cameras through a website and the user selects particular cameras along a route under consideration by the user. For example, a user in the Seattle area may access traffic cameras through the Washington State Department of Transportation system, which provides an interactive map showing several major roadways in the Seattle area along with color-coded traffic conditions and icons representing traffic cameras along these roadways.

Typically, a user selects a camera icon on the interactive map for display of the image from the traffic camera associated with the icon. Information regarding the camera may also be provided, such as the location of the camera, the direction to which the camera is oriented, and a time stamp indicating when the image from the camera was captured.

In order to make decisions about which route a user will take to a destination, one useful input is traffic cameras along that route. The most useful traffic cameras to show any given user are ones that will help the user determine what route to take to a destination. A user may select a traffic camera appearing at a point on the map along a preferred route, e.g., a primary route, in order to evaluate the current traffic conditions at that point in time. The user may also select other cameras along an alternative route in order to evaluate whether to take the alternative route when the primary route is experiencing traffic delays.

Unfortunately, such methods involving a manual selection process can be cumbersome. In addition, camera images may not be provided to drivers in a timely manner since a driver is often tasked to look at camera views before they start their route. Safety becomes an issue when drivers attempt to manually select cameras while driving.

It is with respect to these and other considerations that the disclosure made herein is presented.

SUMMARY

The techniques disclosed herein utilize multiple data sources to select traffic cameras for display to a user that are relevant to a user's decision whether to take one or more alternate routes to a destination. The techniques disclosed herein involve determining a primary route and a first alternate route, determining at least a first traffic intersection between the primary route and the first alternate route, and obtaining camera metadata identifying multiple traffic cameras. The camera metadata can define one or more of positioning data of one or more traffic cameras, data defining a direction of one or more traffic cameras, status data of one or more traffic cameras, and image data of one or more traffic cameras. The techniques also involve determining a priority score for individual traffic cameras using the camera metadata, the priority score being based, at least in part, on their proximity to the first traffic intersection between the primary route and the first alternate route. The techniques can also involve selecting at least one camera of the plurality of traffic cameras based on the priority score of the camera. Image data of the selected camera can be communicated to one or more computers for display on a display device.

Other aspects of the techniques disclosed herein can also include determining a priority score for individual cameras using the camera metadata. In some embodiments, the priority score is further based on data defining the orientation of one or more of traffic cameras, data indicating whether a camera is positioned before or after the first traffic intersection, data defining an operational status, data defining the quality of an image, data defining a type of intersection, data defining a time stamp, data defining a type of image, data defining an individual user history, data defining a crowdsourced history, traffic data, and data defining historical performance of a route and/or intersection.

Still other aspects of the techniques disclosed herein can also include determining a priority score for individual traffic cameras using a weighting factor associated with one or more of a proximity to the first intersection camera orientation, camera position before or after the first intersection, operational status, image quality, type of intersection, time stamp, type of image, individual user history, crowdsourced history, traffic data and historical performance. In some aspects of the techniques disclosed herein, the priority scoring relating to the type of traffic intersection distinguishes between whether the intersection contains a stop sign, a traffic light, an on-ramp, a left turn signal, or a right turn lane.

In some aspects of the techniques disclosed herein, a system can receive a receive a request from a client device for traffic routing information and selection of a number N of traffic cameras for display by the client device, where N is the number of camera image display areas that the client device is configured to display. Responsive to the request from the client device, the system can determine a primary route and an alternate route and determine a first intersection (320) between the primary route and the alternate route. The system can obtain (410) camera metadata identifying a plurality of cameras, where the camera metadata defines at least one of positioning data, direction, status data, and image data for individual cameras of the plurality of cameras. The system determines a priority score for individual cameras of the plurality of cameras using the camera metadata, where the priority score is based, at least in part, on proximity to the first intersection between the primary route and the first alternate route. This system selects N traffic cameras of the plurality of cameras based on the priority score of the camera. The system communicates traffic routing information to the client computing device that includes the primary route and the alternate route along with selection data defining the N selected cameras.

In still other aspects of the techniques disclosed herein, a client system operates to send a request from a client device for traffic routing information and selection of a number N of traffic cameras. The client system receives traffic routing information and selection data for N selected traffic cameras and displays a primary route and an alternate route from the received traffic routing information. Using the received selection data, the client system obtains camera image data for each of the N selected traffic cameras and displays the camera image data for each of the N selected traffic cameras.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 8 is a computer architecture diagram illustrating a computing device architecture for a computing device capable of implementing aspects of the techniques and technologies presented herein.

DETAILED DESCRIPTION

Figure 1:
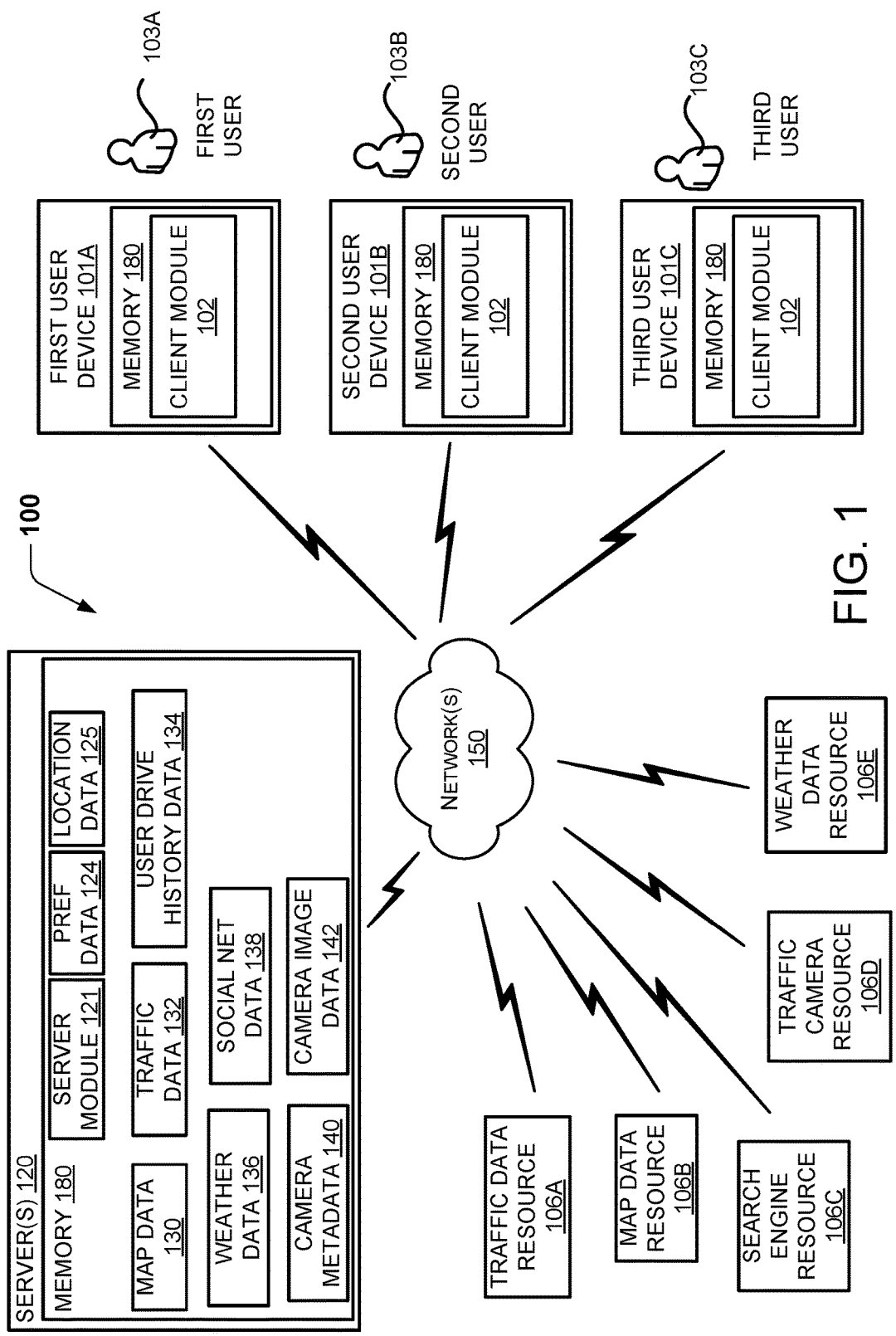
FIG. 1 is a block diagram showing an illustrative system for enabling selection of traffic cameras for display to a user.

The following Detailed Description describes technologies enabling the selection of traffic cameras for display using major traffic route decision points. In order to make decisions about which route a user will take from one location to another, one useful input is traffic cameras along that route. The most useful traffic cameras to show a user are ones that will help the user determine what route that user will take. In some configurations, a primary route and one or more alternative routes are determined based on a user's selection of a starting point and a destination. At least one decision point is identified based on the traffic intersections of the primary and alternative routes. Traffic camera metadata is obtained and used to identify cameras that may be relevant to the decision point based, for example, on the proximity of the traffic camera to the decision point, orientation of the camera, and whether the camera is adjacent to the primary or alternate routes. One or more cameras are selected for display to a user based on relevance of the traffic cameras to the decision point. For illustrative purposes, a decision point can be a location on a route where a driver can decide whether to turn to a first route or turn to a second route. In some configurations, a decision point can include a traffic intersection, where three or more roads intersect, an on-ramp for accessing an expressway, or an exit ramp for leaving an expressway.

In one simplified example, at a traffic intersection between the primary route and an alternate route, there may be several traffic cameras that are relevant to making a decision at the intersection. For illustrative purposes, the intersection, also referred to herein as the first intersection, is a decision point.

A first camera is located near the intersection, positioned at a location along the primary route that a user would encounter while traveling along the primary route before reaching the intersection with the alternate route, and is oriented to face away from the traffic intersection. This first traffic camera would thus have low relevance to the route decision at the intersection due to its location prior to the decision point and because this first traffic camera does not show the traffic at the decision point.

In this illustrative example, a second traffic camera is near the traffic intersection, positioned along the alternate route past the intersection, and oriented to face the intersection. This second traffic camera would thus have high relevance to the route decision because it would show traffic at the decision point.

In this illustrative example, a third traffic camera is positioned along the primary route facing a second intersection that is located ten blocks past the decision point and, based on historical data, which is typically busy. This camera would have moderately high relevance to the route decision because it would show traffic at a historical delay point along the primary route.

Also in this example, a fourth traffic camera is positioned along the alternative route at a location twenty blocks from the first traffic intersection and which may show the flow of traffic along the alternate route at that location. In this example, the fourth traffic camera would have moderate relevance to the route decision because it may show whether traffic along the alternate route is moving.

In some configurations, the traffic cameras are scored based on their relevance to the route decision and are selected for display based on their relevance score. For example, if only two cameras may be displayed, then the second and third cameras are selected. If three cameras may be displayed, then the second, third and fourth cameras are selected.

This is a simplified example and many factors may be considered in selecting traffic cameras for display, such as traffic data, map data, weather data, user preferences, individual historical data, crowdsourced historical data, individual preferences, and status data, as will be discussed in greater detail below. In some configurations, the techniques disclosed herein assign a weighted score to a set of traffic cameras for particular primary and alternate routes.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In order to make decisions about which route a user will take from one location to another, one useful input is traffic cameras along that route. The most useful traffic cameras to show any given user are ones that will help a user determine what route that user will take. In some configurations, a primary route and one or more alternative routes may be determined based on a user's selection of a starting point and a destination. At least one decision point is identified based on the traffic intersections of the primary and alternative routes. Traffic camera metadata is obtained and used to identify cameras that may be relevant to the decision point based, for example, on the proximity of the camera to the decision point, orientation of the camera, and whether the camera is adjacent to the primary or alternate routes. One or more traffic cameras are selected for display to a user based on relevance of the cameras to the decision point.

By the use of the technologies described herein, data from a number of resources can be utilized for enabling the selection of traffic cameras for display using major route decision points. Such technologies can improve user interaction with a computing device by automatically identifying and selecting traffic cameras for display that may be relevant to at least one decision point between primary and alternate routes. Certain configurations may be beneficial in assisting users to decide amongst multiple proposed routes while a computer user is driving a vehicle. Among many benefits provided by the technologies described herein, a user's interaction with a device may be improved, which may reduce the potential for distraction involved in obtaining information pertinent to decisions made while driving. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling selection of traffic cameras for display using major route decision points will be described. As will be described in more detail below with respect to FIGS. 6-8, there are a number of applications and services that may embody the functionality and techniques described herein.

FIG. 1 is a block diagram showing aspects of one example environment 100, also referred to herein as a "system 100," disclosed herein for enabling selection of traffic cameras for display using major route decision points. In one illustrative example, the example environment 100 can include one or more servers 120, one or more networks 150, one or more user devices 101A-101C (collectively "user devices 101"), and one or more resources 106A-106E (collectively "resources 106"). The user devices 101 can be utilized for interaction with one or more users 103A-103C (collectively "users 103"). This example is provided for illustrative purposes only and is not to be construed as limiting. It can be appreciated that the example environment 100 can include any number of devices, users, resources, and/or any number of servers 120.

For illustrative purposes, the resources 106 can be any type of entity capable of providing data suitable for use in the present approach. In general, the techniques disclosed herein enable users to utilize data from a number of resources 106 to generate map data 130, traffic data 132, status data 134, weather data 136, camera metadata 140 and camera image data 142. Data collected from user devices 101 may be used to generate preference data 124, user drive history data 134, and social net data 138. User drive history data 134 includes data pertaining to the drive history for an individual user 103. In some configurations, the historical data from multiple users 103 may be collected to extract crowdsourced history data from user drive history data 134.

The user devices 101, data resources 106, servers 120 and/or any other computer(s) configured with the features disclosed herein can be interconnected through one or more local and/or wide area networks, such as the network 150. In addition, the computing devices can communicate using any technology, such as BLUETOOTH, WIFI, WIFI DIRECT, NFC or any other suitable technology, which may include light-based, wired, or wireless technologies. It should be appreciated that many more types of connections may be utilized than described herein.

A user device 101 can operate as a stand-alone device, or such devices can operate in conjunction with other computers, such as the one or more servers 120. Individual computing devices can be in the form of a personal computer, mobile phone, tablet, wearable computer, including a head-mounted display (HMD) or watch, or any other computing device having components for interacting with one or more users and/or remote computers. In one illustrative example, the user device 101 can include a local memory 180, also referred to herein as a "computer-readable storage medium," configured to store data, such as a client module 102 and other contextual data described herein.

The servers 120 may be in the form of a personal computer, server farm, large-scale computing system or any other computing system having components for processing, coordinating, collecting, storing, and/or communicating data between one or more computing devices. In one illustrative example, the server(s) 120 can include a local memory 180, also referred to herein as a "computer-readable storage medium," configured to store data, such as a server module 121 and other data described herein. The servers 120 can also include components and services, such as the application services and components shown in FIG. 6, for providing, receiving, and processing mapping, traffic data, and other data, and executing one or more aspects of the techniques described herein. As will be described in more detail herein, any suitable module may operate in conjunction with other modules or devices to implement aspects of the techniques disclosed herein.

The system 100 may include a number of resources, such as a traffic data resource 106A, map data resource 106B, search engine resource 106C, traffic camera resource 106D, and a weather data resource 106E (collectively referred to herein as "resources 106"). The resources 106 can be a part of the server(s) 120 or be separate from the server(s) 120, and the resources 106 can provide data relevant to mapping and traffic decisions, including preference data 124, location data 125, map data 130, traffic data 132, user drive history data 134, weather data 136, social network data 138, camera metadata 140, camera image data 142, and other data described herein.

These example resources 106 and data are provided for illustrative purposes only and are not to be construed as limiting. It can be appreciated that the techniques disclosed herein may utilize more or fewer resources 106 as shown in FIG. 1. It can also be appreciated that some of the resources shown in FIG. 1 can obtain any type of mapping, navigation, camera and traffic information from other resources such as social networks, e-commerce systems, government systems, and other like sources. For instance, traffic information data and camera metadata and image data may be provided by a state department of transportation (DOT) website.

Preference data 124 may include user-defined preferences such as preferred destinations or preferred routes. In some configurations, the preference data 124 may include a number of weighted parameters that indicate priorities, preferences, and/or goals. The preference data 124 may also include a user selection for a preferred maximum level of difficulty for a driving route. Location data 125 may include geographic location information, such as GPS coordinates, that identify a location of, for example, the server module 121 or user devices 101 for purposes of searching on-line resources for information pertinent to conditions for the geographical area local to the server module 121 or user devices 101.

The map data 130 can define roads and other types of travel paths within a geographic area. The map data 130 can also include topography data and other data that may influence a commute of a user from one location to another. The map data 130 may also include metadata regarding features on maps, such as identification of types of roads (e.g. expressway, highway, arterial, or residential), types of traffic intersections (e.g. stop sign, traffic light, on-ramp, left turn signal, or right turn lane), or historical data (e.g. busy street crossing or frequent backup point). The map data 130 can also include data defining buildings, homes, and other landmarks. The map data 130 can additionally include image data, which may include a satellite image of the roads and paths within a geographic area, as well as images of buildings, homes and other landmarks. The map data 130 may be from a number of resources, including a web-based service, government services, or other resources.

The traffic data 132 can include real-time updates on vehicle traffic within a geographic area. The traffic data 132 can also include historical travel data that can be used to predict travel times between two or more locations. The traffic data 132 may include historical data indicating routes, streets, intersections, exits, on-ramps, curves, or other traffic features that are historically busy or not busy at a particular time of day (e.g. Route 520 westbound typically has heavy traffic from 4 PM to 7 PM on work days). The traffic data 132 can be in any suitable format for defining projected travel times between two or more locations that considers a time of travel, weather at a time of travel, traffic at a time of travel, and other factors that may influence a projected travel time. For example, the traffic data 132 can include updates with respect to road closures, delays, construction, new roads, or other scenarios that can impact activity with respect to a calendar event. The traffic data 132 may be from a number of resources, including a web-based service, government services, or other resources.

The user drive history data 134 can include driving history data for one or more users 103. For an individual user 103, the drive history data 134 may include frequently taken routes and performance data for those routes. Analyzing an individual user's drive history may indicate routes that are more or less difficult for the user to navigate. Analyzing the collected drive history data from many users may generate crowdsourced data on different routes and historical performance on those routes. The user drive history data 134 may be obtained from user devices 101 as well as from web-based services, government services, or other resources.

The weather data 136 can include current, historical, and forecast data indicating weather conditions. The weather data 136 can include data with respect to wind, precipitation, temperature and other conditions that may influence a commute from one location to another. The weather data 136 can be in any suitable format for enabling the projection of travel times between two or more locations. The weather data 136 may be from a number of resources, including a web-based service, government services, or other resources.

The social net data 138 may include information emanating from social network sources, such as posts about traffic problems, which may be relevant to routes. The social net data 138 would typically be from web-based services, such as social networking websites.

The camera metadata 140 can include, but is not limited to, a camera's identifier, location, orientation, type of camera (e.g. video or still photo), frequency of updates, image quality, status or any other data related to a traffic camera. In some configurations, the metadata 140 can include any format suitable for use in evaluating and scoring a camera for use in user navigation. Camera image data 142 may include images obtained from one or more traffic cameras corresponding to cameras identified in camera metadata 140.

Figure 2:
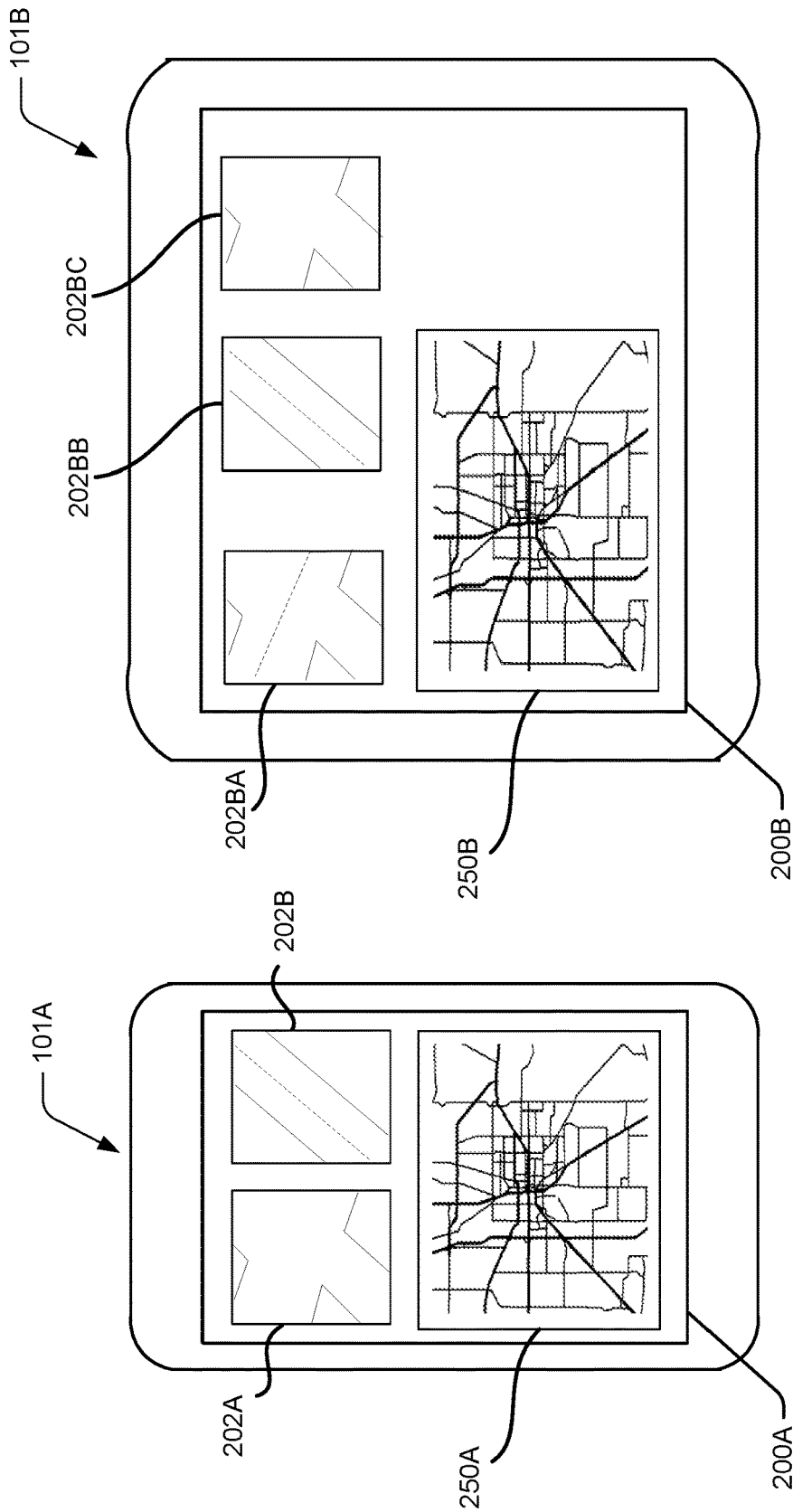
FIGS. 2A-2B are block diagrams showing illustrative examples of devices or systems for providing map data and traffic camera images to a user.

FIGS. 2A and 2B are block diagrams that illustrate examples of a system 100 that provide a framework for several example scenarios utilizing the techniques disclosed herein. More specifically, this block diagram of the system 100 shows an illustrative example of user devices 101A and 101B that provide route navigation information and display camera images that a user may utilize to make driving decisions.

In the example of FIG. 2A, the user device 101A is a mobile telephone having a display screen 200A that includes a map display area 250A and image display areas 202A and 202B. The map display area 250A displays a street map view populated from map data 130 of the server(s) 120 along with navigation indicators to guide a driver. Image display areas 202A and 202B display traffic camera video or still images populated from camera image data 135 that are relevant to decision making with respect to routes shown in map display area 250A in accordance with one or more aspects of the techniques described herein.

In the example of FIG. 2B, the user device 101B is an on-board computer system for installation in a vehicle having a display screen 200B that includes a map display area 250B and image display areas 202BA, 202BB and 202BC. The map display area 250B displays a street map view populated from map data 130 of server(s) 120 along with navigation indicators to guide a driver. Image display areas 202BA, 202BB and 202BC display traffic camera video or still images that are relevant to decision making with respect to routes shown in map display area 250B in accordance with one or more aspects of the techniques described herein. These devices are illustrative examples only and other types of devices may be utilized in accordance with the techniques described herein.

Figure 3:
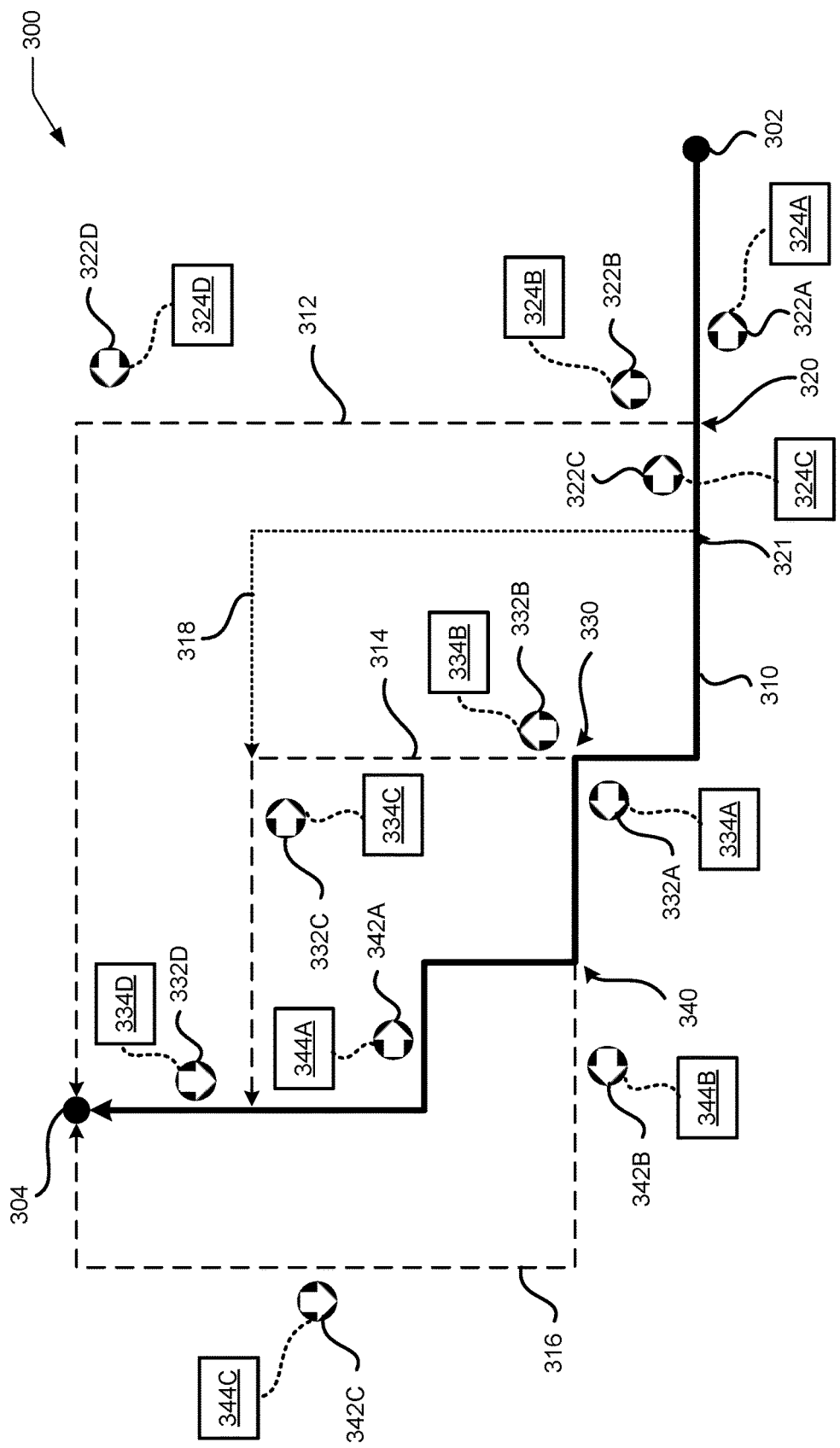
FIG. 3 is a schematic diagram of a map illustrating a primary route, alternative routes and traffic cameras along the routes.

FIG. 3 is a schematic diagram illustrating an example of a routing map 300 to which the techniques described herein may be applied. The example shown includes a starting point 302 and a destination point 304 with a primary route 310 mapped between the points where an arrow on the primary route 310 indicates the direction of travel. In addition, the example includes alternate routes 314 and 316 that are visible to a user on a display, such as map display areas 250A and 250B in FIGS. 2A and 2B. Another alternate route 318 is illustrated that would not normally be displayed to a user, but which may be considered in selecting traffic cameras for display in accordance with the techniques described herein. The primary route 310, first alternate route 312, second alternate route 314, third alternative route 316 and further alternate route 318 may be determined using traffic routing techniques that are known to one of ordinary skill in the art.

The routing map 300 illustrates several decision points where the primary route intersects with the alternate routes. First intersection 320 represents a decision or inflection point for alternate route 312 from primary route 310. Similarly, second intersection 330 represents a decision or inflection point for alternate route 314 from primary route 310 and third intersection 340 represents a decision or inflection point for alternate route 316.

Also included in routing map 300 are a series of icons representing traffic cameras along the primary route 310 and alternate routes 312, 314, 316 and 318. The position of each camera icon on routing map 300 indicates the location of the traffic camera and an arrow in the icon indicates the orientation of the traffic camera. For example, traffic camera 322A is positioned along the primary proposed route 310 between the starting point 302 and first intersection 320 and faces away from the direction of travel along primary route 310 toward starting point 302, which is indicated in the metadata 324A associated with traffic camera 322A. Traffic camera 322B is positioned along alternate route 312 past decision point 320 in the direction of travel along the first alternate route 312 and facing away from the first intersection 320. Traffic camera 326 is positioned in the direction of travel along primary route 310 past decision point 320 and faces back towards decision point 320. The other camera icons similarly represent the location and orientation of a corresponding camera. Camera metadata, which can include, but is not limited to, a camera's identifier, location, orientation, type of camera (e.g. video or still photo), frequency of updates, image quality, status or any other data related to a traffic camera, is indicated in association with its corresponding traffic camera. Thus, camera metadata 324A-D corresponds to traffic cameras 322A-D, camera metadata 334A-D corresponds to traffic cameras 332A-D, and camera metadata 344A-C corresponds to traffic cameras 342A-C.

Figure 4A:
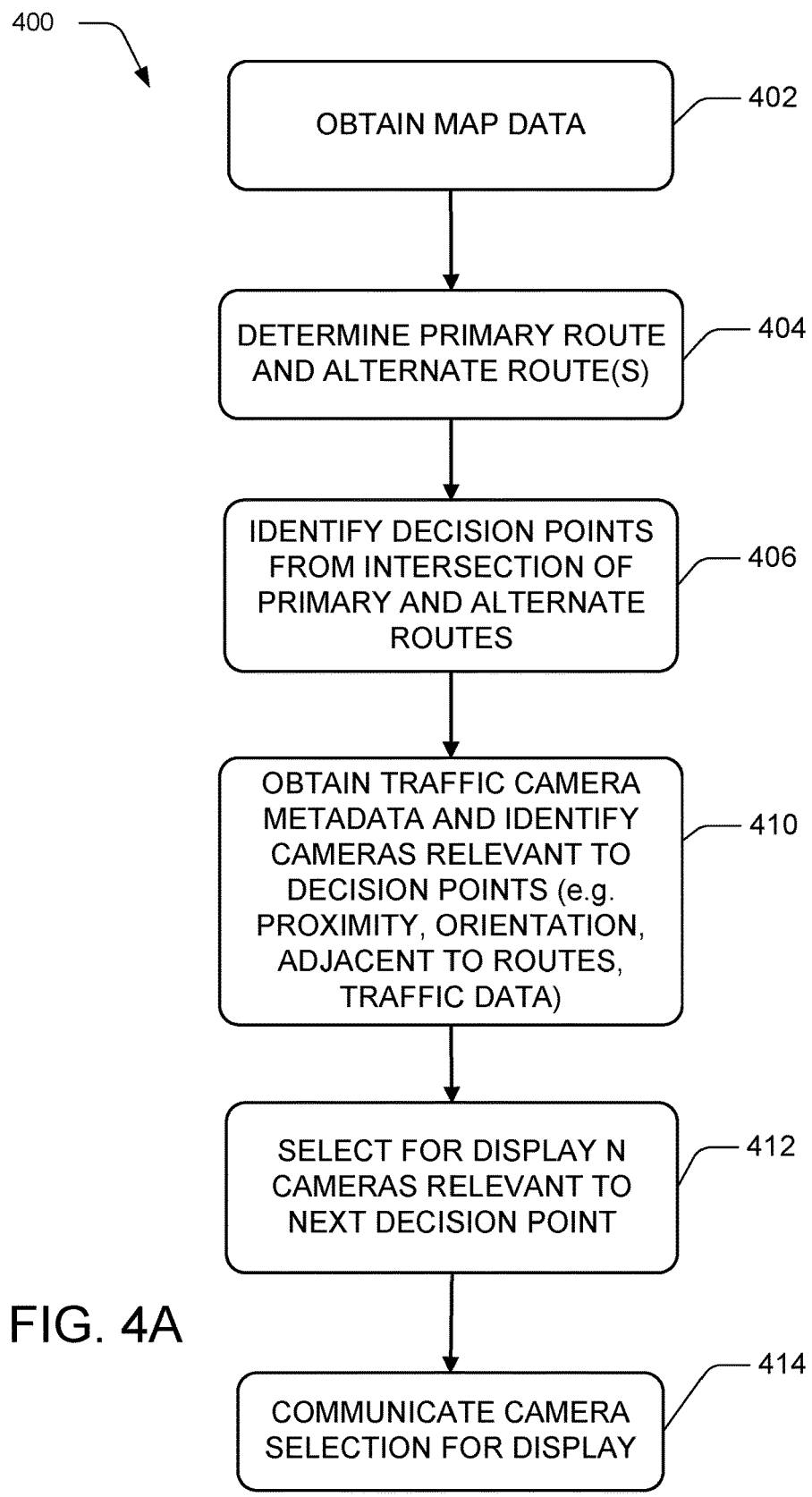
FIGS. 4A, 4B and 4C are flow diagrams showing illustrative examples of routines disclosed herein for selecting traffic cameras for display to a user.
Figure 4B:
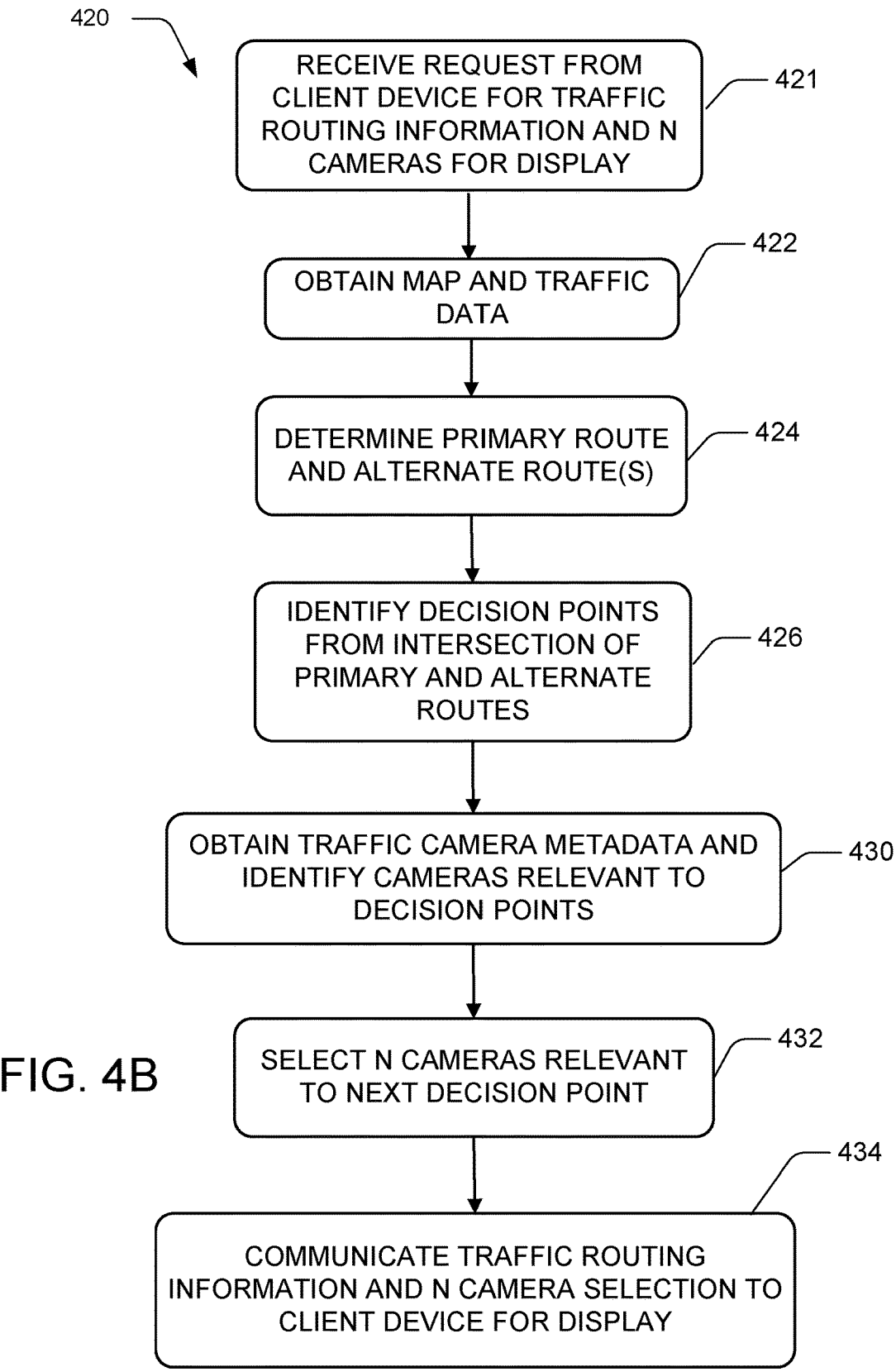
Figure 4C:
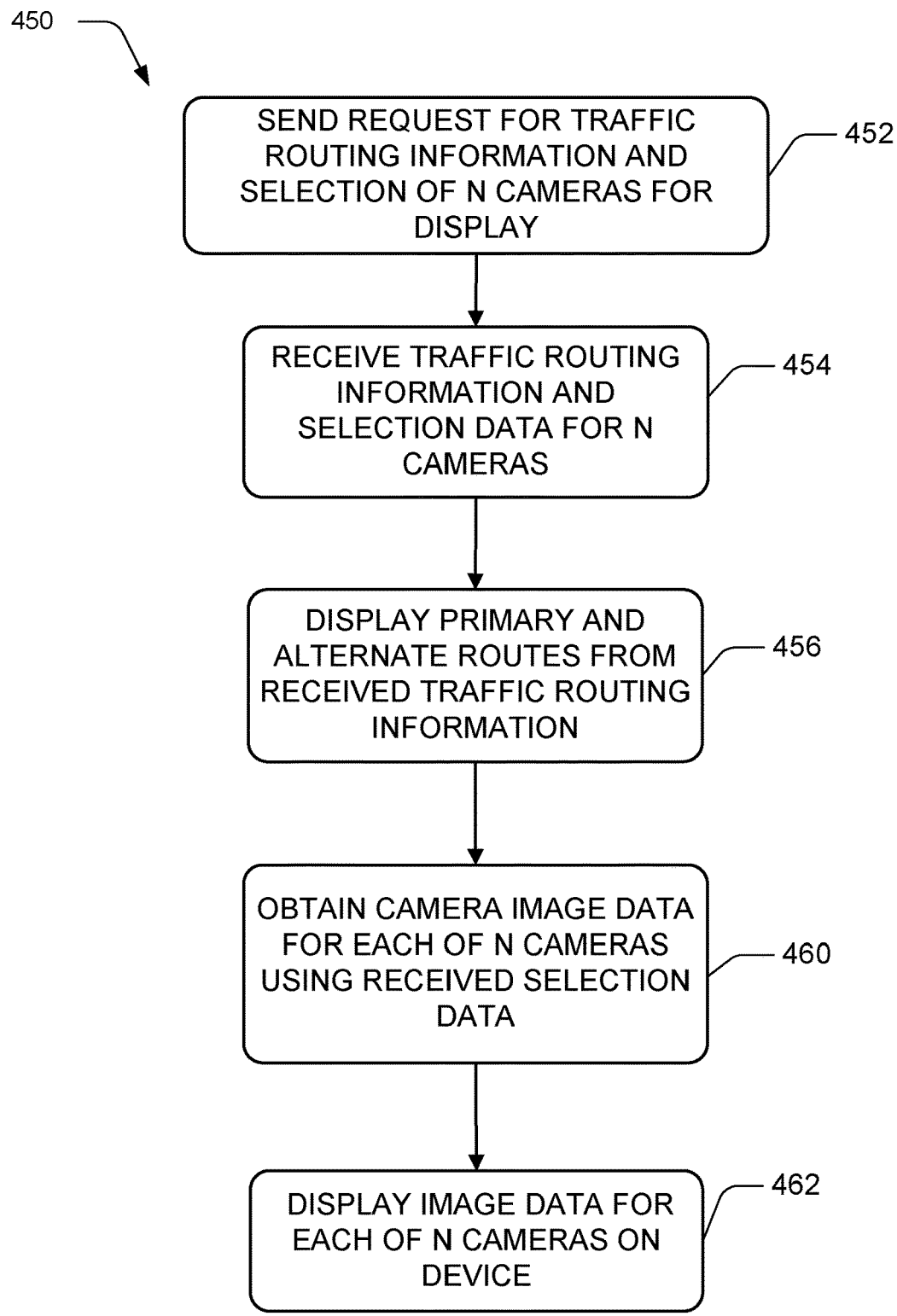

FIGS. 4A, 4B and 4C are flow diagrams illustrating examples of routines for selecting traffic cameras for display to a user. FIG. 4A is a flow diagram illustrating one example of a traffic camera selection process 400 in accordance with certain aspects of the present techniques that can be applicable to a selection process in multiple devices or within a single device. At operation 402, map data is obtained, such as from map data 130. At operation 404, a primary route and at least one alternate route is mapped based on the map data and a user selection of a destination point and either user selection of a starting point or the user's current location. At 406, decision points are identified from the intersections of the primary route and alternate routes. With reference to the example of routing map 300, intersections 320, 321, 330 and 340 are identified from the intersection of primary route 310 with alternate routes 312, 318, 314 and 316, respectively.

At operation 410, traffic camera metadata is obtained, such as from camera metadata 140, and is used to identify traffic cameras that are relevant to the intersections 320, 321, 330 and 340. For example, traffic cameras that are located within a given proximity of the intersections or located along the primary and alternate routes are identified and their metadata analyzed to determine their relevance to the intersections.

With reference to routing map 300, traffic cameras 322A-C may be identified at operation 410 based on their proximity to intersection 320 where primary route 310 and alternate route 312 intersect. Camera 322D may also be identified based on its location adjacent to alternate route 312. Similarly, cameras 332A and 332B may be identified based on their proximity to intersection 330 and cameras 342A and 342B may be identified based on their proximity to intersection 340. Camera 334C may be identified based on its location adjacent to alternate route 314, camera 334D may be identified based on its location adjacent to primary route 310, and camera 344C may be identified based on its location adjacent to alternate route 316.

At operation 412, N cameras are selected for display based on their relevance to a next intersection to be encountered along the proposed route to be traveled. The number N, in this example, is based on the number of camera display areas available for display of camera images to a user. Thus, for user device 101A of FIG. 2, which has two camera display areas 202A and 202B, N is 2. For user device 101B of FIG. 2, which has three camera display areas 202BA, 202BB and 202BC, N is 3.

Returning to FIG. 3, with reference to routing map 300, intersection 320 is the first decision point encountered during travel from starting point 302 on primary route 310. Multiple factors may be utilized in evaluating the relevance of traffic cameras with respect to a decision point. Evaluating the traffic cameras shown in the routing map 300 based on their proximity to intersection 320 scores cameras 322A, 322B and 322C highest, though camera 322A may be scored lower than cameras 322B and 322C because it is positioned before intersection 320 along the direction of travel on primary path 310.

When camera orientation is also considered, camera 322C scores higher than cameras 322A and 322B because it is oriented to face towards intersection 320, whereas camera 322A is pointed back toward starting point 302 and camera 322B is oriented to face along alternate route 312. The other traffic cameras may also be scored based on their adjacency to a primary or alternate path, their proximity to an important intersection, or other factors.

In this example, using N equals 2, such as for user device 101A, cameras 322B and 322C are selected for display. If N is 3, such as for user device 101B, then, based on the relevancy score, camera 322D may also be selected because it is adjacent to alternate route 312, for which traffic intersection 320 is the decision point, and it shows traffic along adjacent route 312.

Returning to FIG. 4A, at operation 414, the camera selection from step 412 is communicated to a device and rendered for display to a user. For example, the camera images for the selected camera may be communicated to a device where the images are rendered for display on a display of the device, such as display 200A of device 101A of FIG. 2A or display 200B of device 101B of FIG. 2B. In another example, identifiers for the selected cameras, e.g. an identifying number or a URL, may be communicated to a device and the client device retrieves the images for the selected cameras for rendering and display on a display of the device. The communication of the camera selection can, for example, involve transmitting the camera selection from a processor that performed the selection to another processor for display or can involve communicating the selection from a process that performed the selection to another process for display within the same computing system or device.

Note that process 400 may be repeated for other intersections or decision points as the user travels along the chosen route. For example, with reference to the example of routing map 300, the user may choose to remain on the primary proposed route 310 at intersection 320, in which case, the next intersection is intersection 330. Here, the traffic cameras are again scored for relevance to intersection 330 and, when N equals 2, cameras 332 and 334 are selected based on their close proximity to the intersection 330. When N equals 3, camera 336 may also be selected based on traffic data indicating heavier traffic on alternate route 314 than primary proposed route 310.

FIG. 4B is a flow diagram illustrating another example of a traffic camera selection process 420 that can be executed in a server or cloud executing environment in order to interact with a client device in accordance with certain aspects of the present techniques. At operation 421, a request is received from a client device, such as a mobile phone, navigation device or on-board computer system, for traffic routing information and a selection of N camera images for display on the client device, the number N being related to the number of camera images that the client device is capable of displaying or is configured to display. At operation 422, similar to operation 402 of FIG. 4A, map data is obtained, such as from map data 130. At operation 424, similar to operation 404 of FIG. 4A, a primary route and at least one alternate route is mapped based on the map data and a user selection of a destination point and either user selection of a starting point or the user's current location. At operation 426, similar to operation 406 of FIG. 4A, decision points are identified from the intersections of the primary route and alternate routes.

At operation 430, similar to operation 410 of FIG. 4A, traffic camera metadata is obtained, such as from camera metadata 140, and is used to identify traffic cameras that are relevant to the intersections 320, 321, 330 and 340.

At operation 432, similar to operation 412 of FIG. 4A, N cameras are selected for display based on their relevance to a next intersection to be encountered along the proposed route to be traveled. The number N, in this example, is based on the number of camera display areas available on the client device for display of camera images to a user. Thus, for user device 101A of FIG. 2, which has two camera display areas 202A and 202B, N is 2. For user device 101B of FIG. 2, which has three camera display areas 202BA, 202BB and 202BC, N is 3.

At operation 434, the traffic routing information, such as the primary 310 and first alternate route 312, is communicated to the client device along with selection data identifying the N selected cameras so that the client device can display the primary and alternate routes and the camera images for the N selected cameras.

FIG. 4C is a flow diagram illustrating another example of a traffic camera selection and display process 450 that can be executed in a client device that can interact with process 420 of FIG. 4B executing in a server or cloud executing environment in accordance with certain aspects of the present techniques. At operation 452, a request is sent from a client device, such as a mobile phone, navigation device or on-board computer system, for traffic routing information and a selection of N camera images for display on the client device, the number N being related to the number of camera images that the client device is capable of displaying or is configured to display. At operation 454, the client device receives traffic routing information and selection data for N selected cameras. At operation 456, the client device displays the primary and alternate routes from the received traffic routing information, such as in map display area 250A of display screen 200A of client device 101A in FIG. 2A or map display area 250B of display screen 200B of client device 101B in FIG. 2B.

At operation 460, the client device uses the received selection data to obtain camera image data for each of the N selected cameras. For example, the selection data may include a URL for the image data for each selected camera, which the client device utilizes to retrieve the corresponding camera image data. At operation 462, the client device displays the image data for each of the N selected cameras, such as in camera image display areas 202A and 202B of display screen 200A of client device 101A in FIG. 2A or camera image display areas 202BA, 202BB and 202BC of display screen 200B of client device 101B in FIG. 2B.

One of ordinary skill in the art will recognize that a wide variety of approaches may be utilized and factors considered in selecting traffic cameras for display without departing from the techniques shown herein.

Figure 5A:
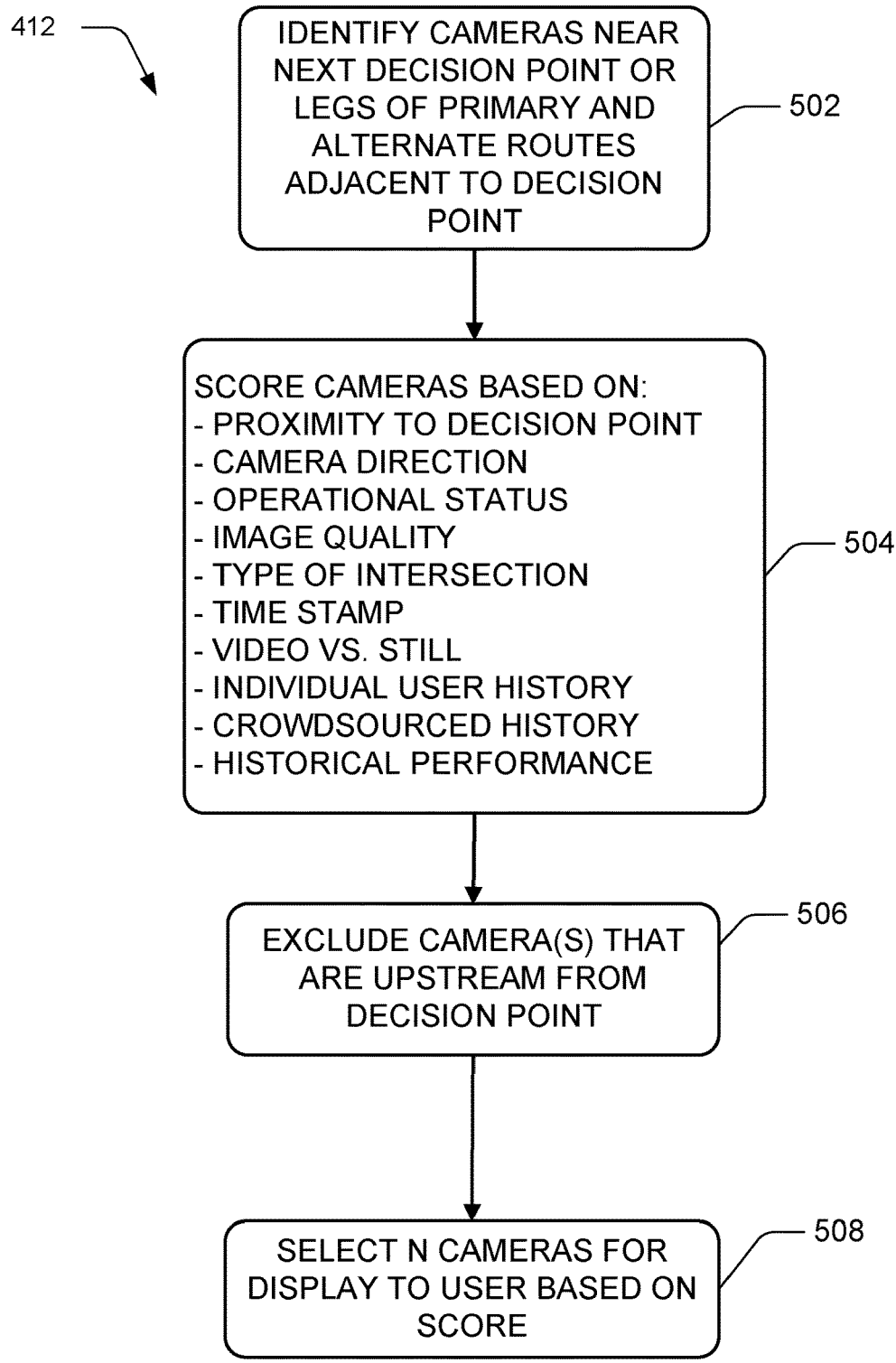
FIGS. 5A and 5B are flow diagrams showing further details of the illustrative example of FIGS. 4A and 4B.

Referring now to FIG. 5A, a flow diagram illustrating one example of an implementation of selection operation 412 is shown and described herein. At operation 502, cameras are identified from camera metadata 140 based on proximity to the next decision point along the route of travel or based on being located on portions of the primary route and alternate routes that are adjacent to the next decision point. With reference to routing map 300, in this example, this results in the identification of cameras 322A, 322B, 322C, and 322D.

Traffic cameras may also be identified based on a correlation between routes, for example, where each of the primary routes and alternate routes includes a bridge with traffic cameras on each bridge showing the traffic. Because the routes are correlated, showing the traffic cameras on each of the bridges may be highly relevant to a user's route decision. This correlation may be determined in a variety of ways, such as from individual user data (e.g. the user typically takes one or the other of the primary or alternate routes at a particular time of day), crowdsourced historical data (e.g. many drivers typically take one of the primary or alternate routes at a particular time of day), or predetermined (e.g. a traffic engineer identifies the correlation).

At operation 504, the identified traffic cameras are scored based on multiple factors. For example, the factors considered may include one or more of: proximity to the decision point, camera direction or orientation, operational status (e.g. out of service), image quality (e.g. camera is historically obscured by rain from a particular direction), type of traffic intersection (e.g. major crossroad, on-ramp to expressway, four-way stop), time stamp (e.g. most up to date image), video or still (e.g. live action video may convey more information regarding traffic), individual user history (e.g. the user's typical commuter route home), crowd-sourced history (e.g. many other users typically take a particular alternate route), historical data (e.g. points that frequently experience delays), or historical performance (e.g. has the user made better time on an alternate route in the past). In this example, at operation 506, traffic cameras that are upstream from the decision point, e.g. positioned at a location along the primary route that a user would encounter before reaching the intersection with the alternate route and are oriented to face away from the traffic intersection, are excluded from consideration as insufficiently relevant. At operation 508, N traffic cameras are selected for display to a user based on the scoring in operation 504. These factors are illustrative examples and are not intended to limit the scope of the techniques shown. Other factors or combinations of factors that yield camera selections that may be useful to a user may be employed in the design of a system in accordance with these techniques.

Figure 5B:
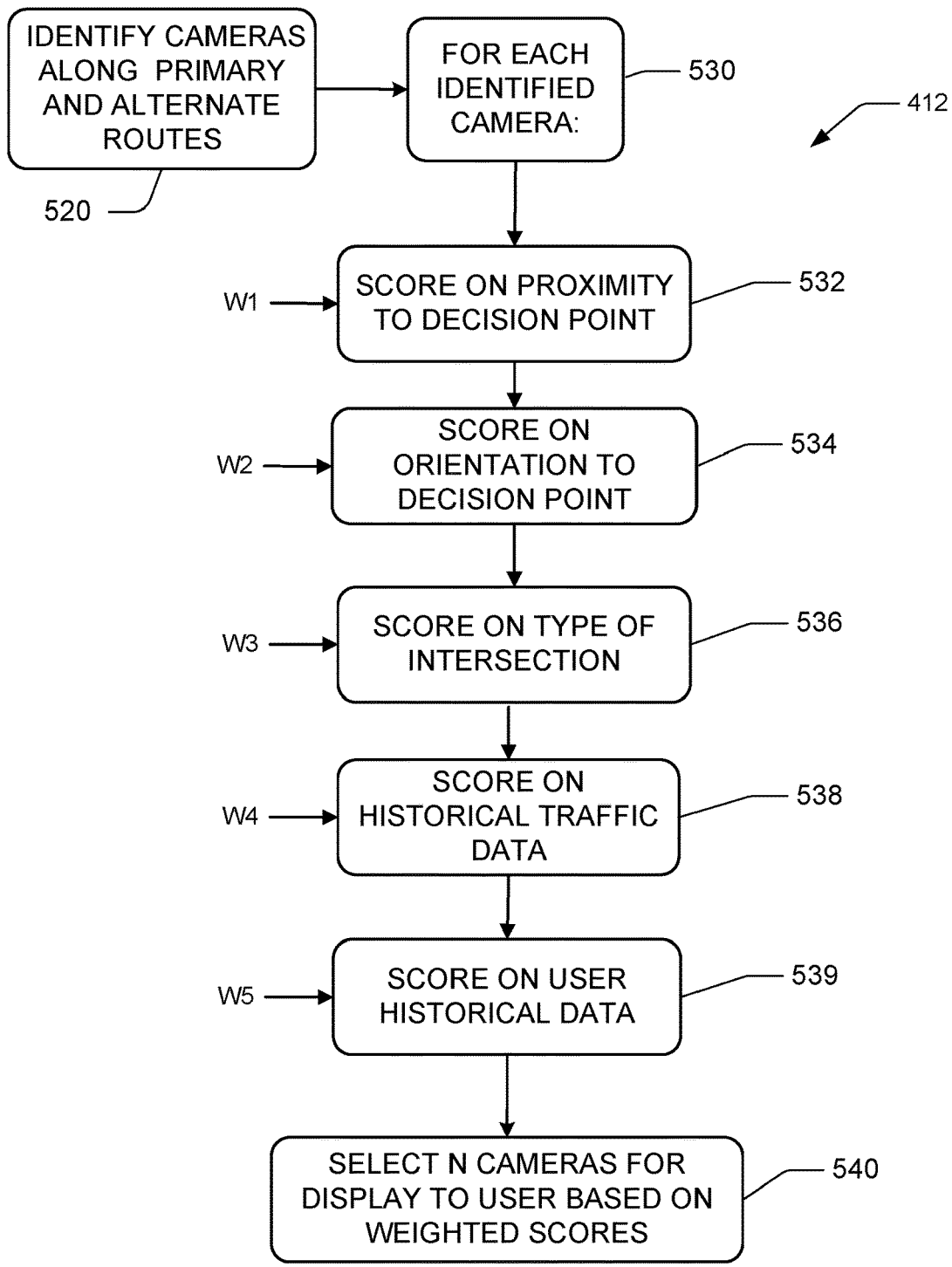

Referring now to FIG. 5B, a flow diagram illustrating another example of an implementation of selection operation 412 utilizing a weighted scoring scheme is shown and described herein. At operation 520, traffic cameras are identified from camera metadata 140 based on being located on portions of the primary proposed route and alternate routes. At operation 530, each identified camera is scored based on cumulative weighted scores for multiple factors. At operation 532, the camera is scored based on proximity to the next decision point and the score is weighted by weighting factor W1, where W1 is a high value to reflect the relative significance of this factor to the selection process. At operation 534, the camera is scored based on its orientation with respect to the intersection or decision point, the score weighted by weighting factor W2, and the result summed with the weighted score from the previous step. At operation 536, the camera is scored based on the type of traffic intersection (e.g. busy street, major crossroad) or roadway (e.g. expressway, arterial, residential) that it is located near, the score weighted by weighting factor W3, and the weighted score added to the cumulative score. Similarly, at operation 538, the traffic camera is scored and weighted based on historical traffic data and, at operation 539, the traffic camera is scored on the user's historical data. At operation 540, N traffic cameras are selected for display based on their weighted scores. The criteria considered for selection and the associated weighting factors are a matter of design choice for an implementer of the techniques described herein and not limited to the illustrative examples shown.

Note that the selection process 400 and other processes described herein may be implemented in a server, such as server module 121, or the cloud, and data defining the traffic camera selections may be communicated to a user device for display. Alternatively, the selection process may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routine 400 are described herein as being implemented, at least in part, by an application, component, and/or circuit. Although the following illustration refers to the components of FIG. 1, it can be appreciated that the operations of the routine 400 may be also implemented in many other ways. For example, the routine 400 may be implemented, at least in part, by a computer processor or a processor or processors of another computer. In addition, one or more of the operations of the process 400 may alternatively or additionally be implemented, at least in part, by a computer working alone or in conjunction with other software modules, such as the server module 121.

For example, the operations of process 400 are described herein as being implemented, at least in part, by an application, component and/or circuit, such as the client module 102 and/or the server module 121, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of FIGS. 1, 6, 7 and 8, it can be appreciated that the operations of the process 400 may be also implemented in many other ways. For example, the process 400 may be implemented, at least in part, by a processor of another remote computer or a local computer or circuit. In addition, one or more of the operations of the process 400 may alternatively or additionally be implemented, at least in part, by a chipset working alone or in conjunction with other software modules. Any service, circuit or application suitable for providing the techniques disclosed herein can be used in operations described herein.

At operation 414, the camera selection may be communicated for display to a user. For example, one computing device, such as server 120, may select the N cameras for display and then communicate that selection to another computer device, such as user device 101, for display to a user. The communication may take the form of an identifier, such as a URL from camera metadata 140, being sent for each selected camera or the camera image for each selected camera, such as image data from camera image data 135, being sent to the other computer device. In another example, the selection of the cameras for display may be made in a computing device, such as user device 101, and communicated to a display within the same device.

Figure 6:
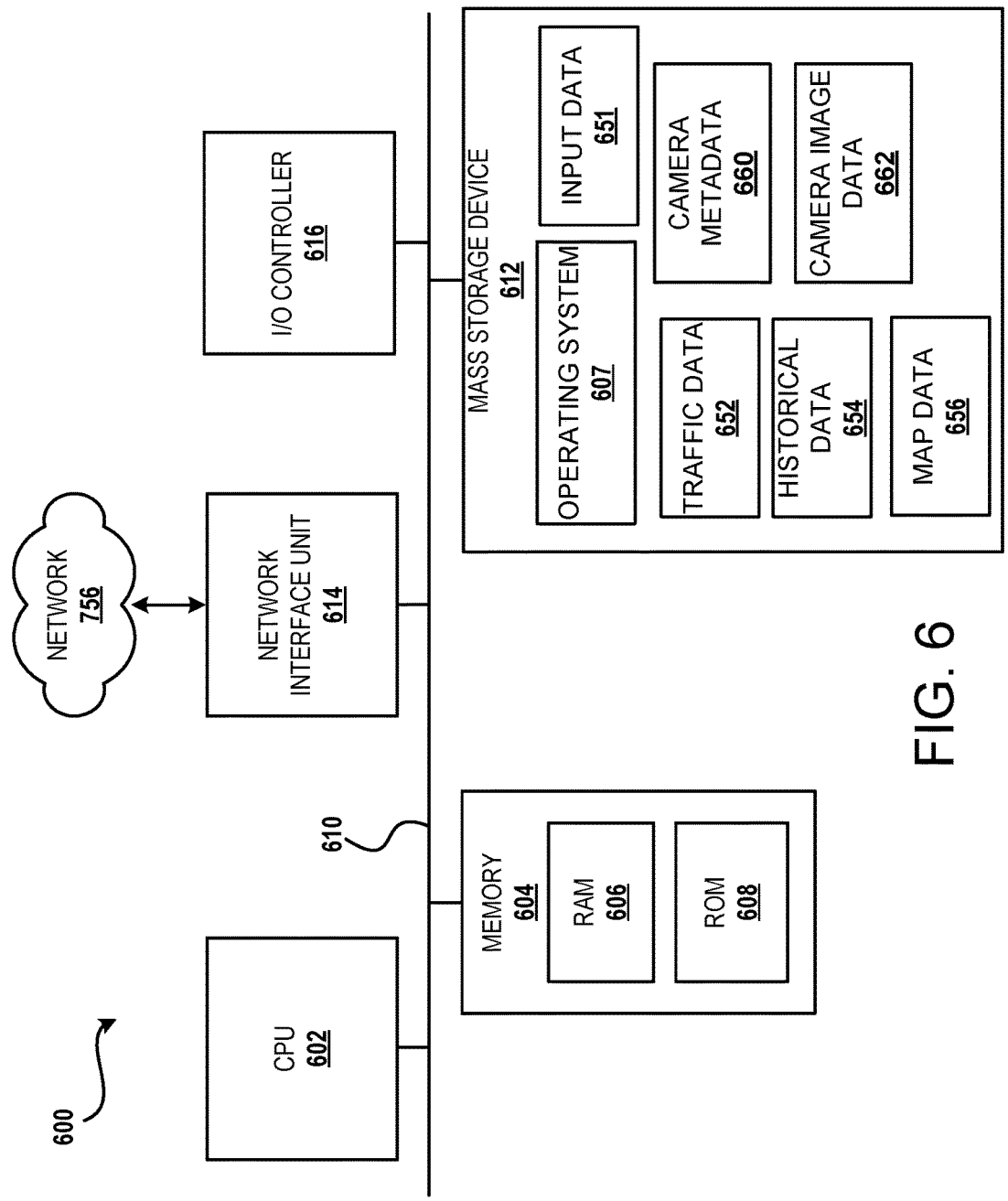
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as the computing device 101 (FIG. 1), capable of executing the program components described herein. Thus, the computer architecture 600 illustrated in FIG. 6 illustrates an architecture for a server computer, mobile phone, a PDA, a smart phone, a desktop computer, a netbook computer, a tablet computer, an on-board computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, data, such as input data 651, traffic data 652, historical data 654, map data 656, camera metadata 660, camera image data 662, and one or more application programs (description here doesn't match FIG. 6).

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 756 and/or another network (not shown). The computer architecture 600 may connect to the network 756 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
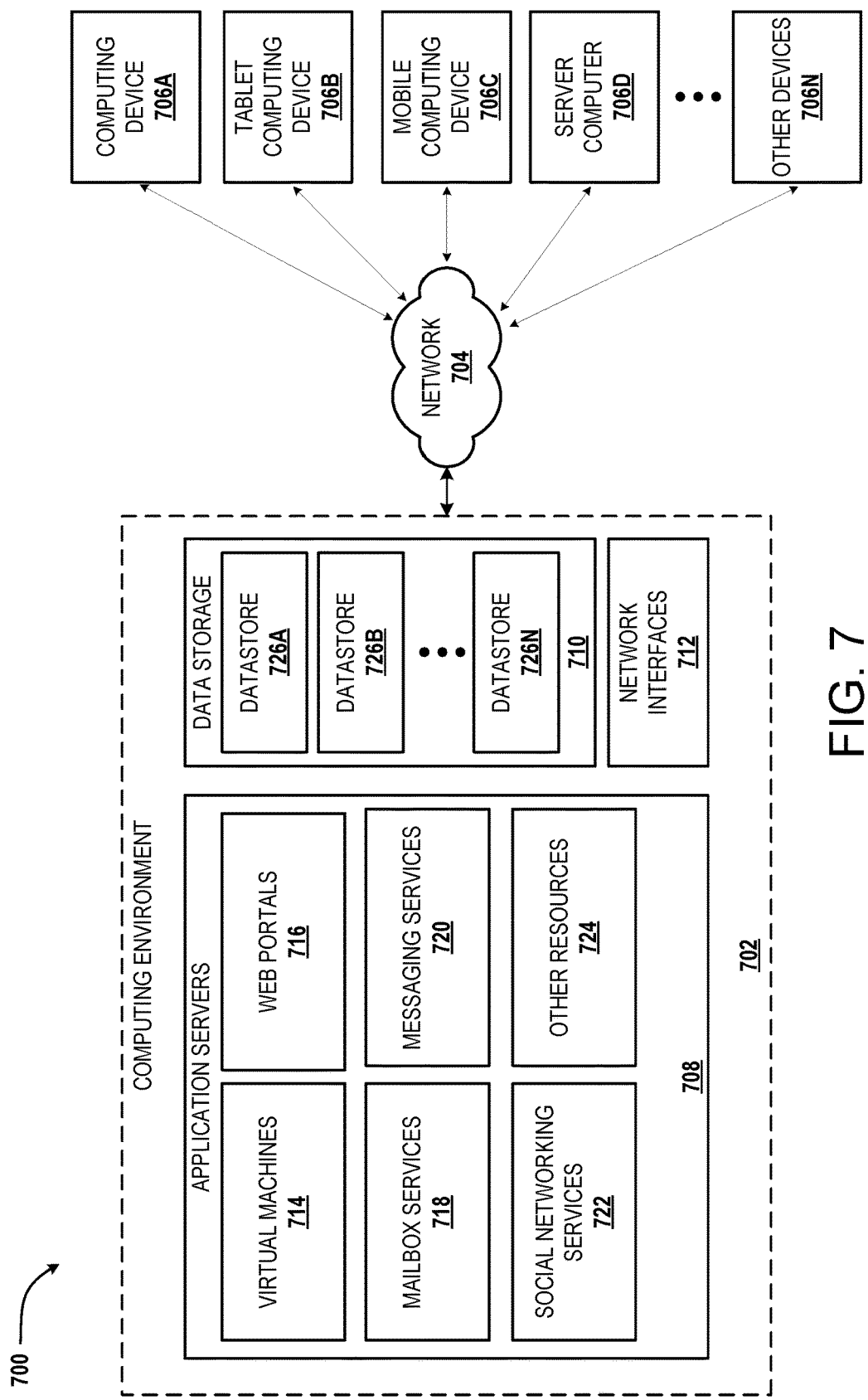
FIG. 7 is a diagram illustrating a distributed computing environment capable of implementing aspects of the techniques and technologies presented herein.

FIG. 7 depicts an illustrative distributed computing environment 700 capable of executing the software components described herein for enabling selection of traffic cameras for display to a user. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 756, described above. The network 704 also can include various access networks. One or more client devices 706A-706N (hereinafter referred to collectively and/or generically as "clients 706") can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, an on-board computer, or other mobile computing device; a server computer 706D; and/or other devices 706N. It should be understood that any number of devices 706 can communicate with the computing environment 702. Two example computing architectures for the devices 706 are illustrated and described herein with reference to FIGS. 6 and 8. It should be understood that the illustrated devices 706 and computing architectures illustrated and described herein are illustrative ony, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling selection of traffic cameras for display to a user. It should be understood that this configuration is illustrative only, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein for selecting traffic cameras for display to a user. For instance, any one of the application servers 708 may communicate or facilitate the functionality and features described herein. For instance, a social networking application, mail client, messaging client or a browser running on a mobile telephone or any other client 706 may communicate with a networking service 722 and facilitate the functionality, even in part, described above with respect to FIG. 7.

As shown in FIG. 7, the application servers 708 also can host other services, applications, portals, and/or other resources ("other resources") 724. The other resources 724 can include, but are not limited to, document sharing, rendering, or any other functionality. It thus can be appreciated that the computing environment 702 can provide integration of the concepts and technologies disclosed herein with various mailbox, messaging, social networking, and/or other services or resources.

As mentioned above, the computing environment 702 can include data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual data stores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients using devices 706. It should be understood that the devices 706 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for enabling selection of traffic cameras for display to a user, among other aspects.

Turning now to FIG. 8, an illustrative computing device architecture 800 for a computing device that is capable of executing various software components is described herein for enabling selection of traffic cameras for display to a user. The computing device architecture 800 is applicable to computing devices that facilitate mobile computing due, in part, to form factor, wireless connectivity, and/or battery-powered operation. In some configurations, the computing devices include, but are not limited to, mobile telephones, on-board computers, tablet devices, slate devices, portable video game devices, and the like. The computing device architecture 800 is applicable to any of the clients 706 shown in FIG. 7. Moreover, aspects of the computing device architecture 800 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 756 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or be adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited to, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one of the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interfaces described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative only and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 842. As such, the above gestures should be understood as being illustrative only and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspects of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following examples:

Example 1

A computer-implemented method comprising: determining (404), at a computing device (800), a primary route (310) and a first alternate route (312); determining (406), at the computing device, at least a first intersection (320) between the primary route (310) and the first alternate route (312); obtaining (410), at the computing device (800), camera metadata (324, 334, 344) identifying a plurality of cameras (322, 332, 342), wherein the camera metadata defines at least one of positioning data, direction, status data, and image data for individual cameras of the plurality of cameras; determining (504), at the computing device, a priority score for individual cameras of the plurality of cameras using the camera metadata, the priority score being based, at least in part, on proximity to the first intersection between the primary route and the first alternate route; selecting (412), at the computing device, at least one camera of the plurality of cameras based on the priority score of the camera; and communicating (414), from the computing device to a client computing device, selection data defining the at least one camera, the selection data causing the client computing device to receive image data of the at least one camera for display on a display device.

Example 2

The computer-implemented method of Example 1, wherein the first intersection between the primary route and the first alternate route further comprises a first intersection encountered along the primary route in a direction of travel from a starting point of the primary route toward a destination point of the primary route.

Example 3

The computer-implemented method of any of the above Examples, wherein the first intersection between the primary route and the first alternate route further comprises a next intersection encountered along the primary route in a direction of travel from a current location on the primary route toward a destination point of the primary route.

Example 4

The computer-implemented method of any of the above Examples, the method further including: determining (404), at a computing device, a second alternate route (314); determining (406), at the computing device, at least a first intersection (330) between the primary route and the second alternate route; determining (504), at the computing device, a priority score for individual cameras (332) of the plurality of cameras using the camera metadata (334), the priority score being based, at least in part, on proximity to the first intersection between the primary route and the second alternate route; selecting (412), at the computing device, at least one other camera of the plurality of cameras (332) based on the priority score of the camera based, at least in part, on proximity to the first intersection between the primary route and the second alternate route; and communicating (414), at the computing device, imaged data of the at least one other camera for display on a display device.

Example 5

The computer-implemented method of any of the above Examples, wherein the step of determining (504), at the computing device, a priority score for individual cameras of the plurality of cameras using the camera metadata, the priority score being based, at least in part, on proximity to the first intersection between the primary route and the first alternate route includes further basing the priority score on at least one of camera orientation, position before or after the first intersection, operational status, image quality, type of intersection, time stamp, type of image, individual user history, crowdsourced history, traffic data and historical performance.

Example 6

The computer-implemented method of any of the above Examples, wherein determining a priority score for individual cameras includes determining a priority score for individual cameras using a weighting factor for each of the proximity to the first intersection and the one or more of camera orientation, position before or after the first intersection, operational status, image quality, type of intersection, time stamp, type of image, individual user history, crowdsourced history, traffic data and historical performance.

Example 7

The computer-implemented method of any of the above Examples, wherein the scoring relating to the type of intersection distinguishes between whether the intersection has a stop sign, a traffic light, an on-ramp, a left turn signal, or a right turn lane.

Example 8

The computer-implemented method of any of the above Examples, wherein one of the primary and first alternate routes is determined based on user historical data.

Example 9

The computer-implemented method of any of the above Examples, wherein one of the primary and first alternate routes is determined based on user historical data.

Example 10

A system (800), the system (800) comprising: a processor (802); a display; and a memory (804) in communication with the processor (802), the memory (802) having computer-readable instructions stored thereupon that, when executed by the processor (802), cause the processor (802) to perform a method comprising: determining (404) a primary route (310) and a first alternate route (318); determining (406) at least a first intersection (320) between the primary route (310) and the first alternate route (318); obtaining (410) camera metadata identifying a plurality of cameras (322, 332, 342), wherein the camera metadata defines at least one of positioning data, direction, status data, and image data for individual cameras of the plurality of cameras (324, 334, 344); determining (504) a priority score for individual cameras of the plurality of cameras using the camera metadata, where the priority score is based, at least in part, on proximity to the first intersection between the primary route and the first alternate route; selecting (412) at least one camera of the plurality of cameras based on the priority score of the camera; and receiving (414) image data generated by the at least one camera for rendering the image data on the display.

Example 11

The system of any of the above Examples, wherein the first intersection between the primary route and the first alternate route further comprises a first intersection encountered along the primary route in a direction of travel from a starting point of the primary route toward a destination point of the primary route.

Example 12

The system of any of the above Examples, wherein the first intersection between the primary route and the first alternate route further comprises a next intersection encountered along the primary route in a direction of travel from a current location on the primary route toward a destination point of the primary route.

Example 13

The system of any of the above Examples, wherein the method further comprises: determining (404) a second alternate route (314); determining (406) at least a first intersection (330) between the primary route and the second alternate route; determining (504) a priority score for individual cameras of the plurality of cameras using the camera metadata, the priority score being based, at least in part, on proximity to the first intersection between the primary route and the second alternate route; selecting (412) at least one other camera (332) of the plurality of cameras based on the priority score of the camera based, at least in part, on proximity to the first intersection between the primary route and the second alternate route; and receiving (414) image data generated by the at least one other camera for rendering the image data on the display.

Example 14

The system of any of the above Examples, wherein the step of determining a priority score for individual cameras of the plurality of cameras using the camera metadata, where the priority score is based, at least in part, on proximity to the first intersection between the primary route and the first alternate route includes further basing the priority score on at least one of camera orientation, position before or after the first intersection, operational status, image quality, type of intersection, time stamp, type of image, individual user history, crowdsourced history, traffic data and historical performance Example 15

The system of any of the above Examples, wherein determining a priority score for individual cameras includes determining a priority score for individual cameras using a weighting factor for each of the proximity to the first intersection and the one or more of camera orientation, position before or after the first intersection, operational status, image quality, type of intersection, time stamp, type of image, individual user history, crowdsourced history, traffic data, or data defining a historical performance of one or more routes.

Example 16

A computer storage medium having computer executable instructions stored thereon which, when executed by one or more processors, cause the processors to execute a method comprising: determining (404) a primary route (310) and a first alternate route (312); determining (406) at least a first intersection (320) between the primary route and the first alternate route; obtaining (410) camera metadata (324, 334, 344) identifying a plurality of cameras (322, 332, 342), wherein the camera metadata defines at least one of positioning data, direction, status data, and image data for individual cameras of the plurality of cameras; determining (504) a priority score for individual cameras of the plurality of cameras using the camera metadata, the priority score is based, at least in part, on proximity to the first intersection between the primary route and the first alternate route; selecting (412) at least one camera (322) of the plurality of cameras based on the priority score of the camera; and communicating (414) the selection of the at least one other camera to a client computing device, the selection data causing the client computing device to receive image data of the at least one camera for display on a display of the client computing device.

Example 17

The computer storage medium of any of the above Examples, wherein the first intersection between the primary route and the first alternate route further comprises a first intersection encountered along the primary route in a direction of travel from a starting point of the primary route toward a destination point of the primary route.

Example 18

The computer storage medium of any of the above Examples, wherein the first intersection between the primary route and the first alternate route further comprises a next intersection encountered along the primary route in a direction of travel from a current location on the primary route toward a destination point of the primary route.

Example 19

The computer storage medium of any of the above Examples, wherein the method further comprises: determining (404) a second alternate route (314); determining (406) at least a first intersection (330) between the primary route and the second alternate route; determining (504) a priority score for individual cameras of the plurality of cameras using the camera metadata, where the priority score is based, at least in part, on proximity to the first intersection between the primary route and the second alternate route; selecting (412) at least one other camera (332) of the plurality of cameras based on the priority score of the camera based, at least in part, on proximity to the first intersection between the primary route and the second alternate route; and receiving (414) image data generated by the at least one other camera for rendering the image data on the display.

Example 20

The computer storage medium of any of the above Examples, wherein the step of determining (504) a priority score for individual cameras of the plurality of cameras using the camera metadata, where the priority score is based, at least in part, on proximity to the first intersection between the primary route and the first alternate route, and wherein the priority score is further based, at least in part, on at least one of a camera orientation, a position before or after the first intersection, an operational status, an image quality, a type of intersection, a time stamp, a type of image, an individual user history, data defining a crowdsourced history, traffic data, or data defining a historical performance of one or more routes.

Example 21

A computer system (800), the system (800) comprising: at least a first processor (802); and a first memory (804) in communication with the first processor (802), the first memory (804) having computer-readable instructions stored thereupon that, when executed by the first processor (802), cause the first processor (802) to perform the following operations: receive (421) a request from a client device for traffic routing information and selection of a number N of traffic cameras for display by the client device; responsive to the request from the client device, determine (424), a primary route (310) and a first alternate route (312); determine (426), at least a first intersection (320) between the primary route (310) and the first alternate route (312); obtain (410) camera metadata (324, 334, 344) identifying a plurality of cameras (322, 332, 342), wherein the camera metadata defines at least one of positioning data, direction, status data, and image data for individual cameras of the plurality of cameras; determine (504) a priority score for individual cameras of the plurality of cameras using the camera metadata, the priority score being based, at least in part, on proximity to the first intersection between the primary route and the first alternate route; select (432) N traffic cameras of the plurality of cameras based on the priority score of the camera; and communicate (434) to the client computing device traffic routing information including the primary route and the first alternate route along with selection data defining the N selected cameras.

Example 22

The computer system of any of the above Examples, The system of claim 21, where the first memory (804) further includes instructions stored thereupon that, when executed by the first processor (802), cause the first processor (802) to further perform the following: determine (424) a second alternate route (314); determine (426) at least a first intersection (330) between the primary route and the second alternate route; determine (504) a priority score for individual cameras of the plurality of cameras using the camera metadata, the priority score being based, at least in part, on proximity to the first intersection between the primary route and the second alternate route; select (432) another N cameras (332) of the plurality of cameras based on the priority score of each camera based, at least in part, on proximity to the first intersection between the primary route and the second alternate route; and communicate (434) to the client computing device traffic routing information including the primary route and the second alternate route along with selection data defining the another N selected cameras.

Example 23

The computer system of any of the above Examples, the system further including a client computer system (800), the client system (800) comprising: at least a second processor (802); a display (200) capable of displaying up to N traffic camera images (202); and a second memory (804) in communication with the second processor (802), the second memory (804) having computer-readable instructions stored thereupon that, when executed by the second processor (802), cause the second processor (802) to perform the following operations: send (452) the request from the client computer system to the first processor for traffic routing information and selection of a number N of traffic cameras; receive (454) from the first processor traffic routing information and selection data for N selected traffic cameras; display a primary route (310) and a first alternate route (312) from the received traffic routing information; using the received selection data, obtain (460) camera image data (202) for each of the N selected traffic cameras; and display (462) the camera image data for each of the N selected traffic cameras.

Example 24

A client computer system (800), the client system (800) comprising: at least one processor (802); a display (200) capable of displaying up to N traffic camera images (202); and a memory (804) in communication with the processor (802), the memory (804) having computer-readable instructions stored thereupon that, when executed by the processor (802), cause the processor (802) to perform the following operations: send (452) a request from a client device for traffic routing information and selection of a number N of traffic cameras; receive (454) traffic routing information and selection data for N selected traffic cameras; display a primary route (310) and a first alternate route (312) from the received traffic routing information; using the received selection data, obtain (460) camera image data (202) for each of the N selected traffic cameras; and display (462) the camera image data for each of the N selected traffic cameras.

What is claimed is:
1. A computer-implemented method comprising:
determining, at one or more computing devices, a primary route from a current location to a destination and an alternate route from the current location to the destination;
determining, at the one or more computing devices, an intersection that is usable to transition off of the primary route to the destination and onto the alternate route to the destination;
obtaining, at the one or more computing devices, camera metadata identifying a plurality of cameras, wherein the camera metadata defines at least current geographic positions of individual cameras of the plurality of cameras;
determining, at the one or more computing devices based on the camera metadata, a priority score for the individual cameras of the plurality of cameras, the priority score being based, at least in part, on proximity of the current geographic positions of the individual cameras to the intersection that is usable to transition off of the primary route to the destination and onto the alternate route to the destination;

selecting, at the one or more computing devices, a subset of N cameras that are associated with the intersection and that each have a corresponding priority score that is above other priority scores for other cameras that are excluded from the subset of N cameras, wherein N is a positive integer value that is determined based on one or more configuration parameters of a client device; and communicating, from the one or more computing devices to the client device, selection data to cause the client device to render image data that is captured by the subset of N cameras and that is indicative of current traffic conditions corresponding to the intersection that is usable to transition off of the primary route and onto the alternate route.

2. The computer-implemented method of claim 1, wherein the intersection is along the primary route in a direction of travel from a starting point of the primary route toward the destination.

3. The computer-implemented method of claim 1, wherein the intersection is along the primary route in a direction of travel from the current location on the primary route toward the destination.

4. The computer-implemented method of claim 1, further including:
  determining, at the one or more computing devices, another alternate route;
  determining, at the one or more computing devices, another intersection that is usable to transition off of the primary route and onto the other alternate route;
  determining, at the one or more computing devices, at least one priority score for at least some of the individual cameras using the camera metadata, the at least one priority score being based, at least in part, on current geographic proximity of the at least some of the individual cameras to the other intersection between the primary route and the other alternate route;
  selecting, at the one or more computing devices, at least one other camera of the plurality of cameras based on the at least one priority score; and
  communicating, from the one or more computing devices to the client device, other image data of the at least one other camera for display on a display device.

5. The computer-implemented method of claim 1, wherein the determining the priority score for the individual cameras is further based on at least one of camera orientation, position before or after the intersection, operational status, image quality, type of intersection, time stamp, type of image, individual user history, crowdsourced history, traffic data, and historical performance.

6. The computer-implemented method of claim 5, wherein the determining the priority score for the individual cameras includes determining the priority score for the individual cameras using a weighting factor for: the proximity of the current geographic positions of the individual cameras to the intersection, and the at least one of camera orientation, position before or after the intersection, operational status, image quality, type of intersection, time stamp, type of image, individual user history, crowdsourced history, traffic data, and historical performance.

7. The computer-implemented method of claim 1, wherein the determining the priority score for the individual cameras is based further on whether the intersection has a stop sign, a traffic light, an on-ramp, a left turn signal, or a right turn lane.

8. The computer-implemented method of claim 1, wherein at least one of the primary route and the alternate route is determined based on user historical data.

9. A system, the system comprising:
  a processor; and
  a memory in communication with the processor, the memory having computer-readable instructions stored thereupon that, when executed by the processor, cause the processor to perform operations that include:
    determining a primary route from a current location to a destination and an alternate route from the current location to the destination;
    determining an intersection that is usable to transition off of the primary route and onto the alternate route;
    obtaining camera metadata that defines current geographic positions for individual cameras of a plurality of cameras;
    determining, based on the camera metadata, individual priority scores for the individual cameras, of the plurality of cameras, based, at least in part, on proximity of the current geographic positions for the individual cameras to the intersection that is usable to transition off of the primary route and onto the alternate route;
    selecting a subset of cameras that are associated with the intersection based on the individual priority scores for the individual cameras; and
    causing a display to render image data that is generated by the subset of cameras and that is indicative of current traffic conditions at the intersection that is usable to transition between the primary route and the alternate route.

10. The system of claim 9, wherein the intersection is along the primary route in a direction of travel from a starting point of the primary route toward the destination.

11. The system of claim 9, wherein the intersection is along the primary route in a direction of travel from the current location on the primary route toward the destination.

12. The system of claim 9, wherein the computer-readable instructions cause the processor to perform further operations that include:
  determining a second alternate route;
  determining another intersection between the primary route and the second alternate route; and
  determining other individual priority scores for the individual cameras of the plurality of cameras using the camera metadata, the other priority scores being based, at least in part, on proximity of the current geographic positions for the other individual cameras to the other intersection between the primary route and the second alternate route;
  selecting at least one other camera of the plurality of cameras based on the at least one other priority score; and
  receiving image data generated by the at least one other camera for rendering the image data on the display.

13. The system of claim 9, wherein the determining the individual priority scores for the individual cameras is further based on at least one of camera orientation, position before or after the intersection, operational status, image quality, type of intersection, time stamp, type of image, individual user history, crowdsourced history, traffic data, and historical performance.

14. The system of claim 13, wherein the determining the individual priority scores for the individual cameras includes using a weighting factor for at least some of the proximity to the intersection and the one or more of camera orientation, position before or after the first intersection, operational status, image quality, type of intersection, time stamp, type of image, individual user history, crowdsourced history, traffic data, or data defining a historical performance of one or more routes.

15. The system of claim 9, wherein the subset of cameras is a subset of N cameras, wherein N is a positive integer value that is determined based on configuration parameters for displaying imagery on a client device.

16. A computer storage medium having computer executable instructions stored thereon which, when executed by one or more processors, cause the one or more processors to perform operations comprising:
  determining a primary route from a current location to a destination and an alternate route from the current location to the destination;
  determining an intersection that is usable to transition off of the primary route and onto the alternate route;
  obtaining camera metadata identifying a plurality of cameras, wherein the camera metadata defines at least current geographic positions for individual cameras of the plurality of cameras;
  determining individual priority scores for the individual cameras of the plurality of cameras using the camera metadata, wherein the individual priority scores are based, at least in part, on proximity of the current geographic positions for the individual cameras to the intersection between the primary route and the alternate route;
  selecting a subset of N cameras that are associated with the intersection and that have corresponding priority scores that are above other priority scores for other cameras that are excluded from the subset of N cameras; and
  communicating selection data to cause a display of the client device to render images that are captured by the subset of N cameras and that are indicative of current traffic conditions at the intersection that is usable to transition between the primary route and the alternate route.

17. The computer storage medium of claim 16, wherein the intersection is encountered along the primary route in a direction of travel from a starting point of the primary route toward the destination.

18. The computer storage medium of claim 16, wherein the intersection is encountered along the primary route in a direction of travel from a current location on the primary route toward the destination.

19. The computer storage medium of claim 16, the operations further comprising receiving a request from the client device for traffic routing information, wherein the request includes an indication of the positive integer value of N.

20. The computer storage medium of claim 16, wherein the selecting the subset of N cameras is responsive to the request.

* * * * *